No. 766,655. Patented August 2, 1904.

UNITED STATES PATENT OFFICE.

RALPH BAGGALEY, OF PITTSBURG, PENNSYLVANIA, AND CHARLES M. ALLEN, OF LOLO, MONTANA; SAID ALLEN ASSIGNOR TO SAID BAGGALEY.

METHOD OF SMELTING ORE AND CLEANING CONVERTER-SLAG.

SPECIFICATION forming part of Letters Patent No. 766,655, dated August 2, 1904.

Application filed March 19, 1904. Serial No. 199,027. (No specimens.)

*To all whom it may concern:*

Be it known that we, RALPH BAGGALEY, of Pittsburg, Allegheny county, Pennsylvania, and CHARLES M. ALLEN, of Lolo, Missoula county, Montana, have invented a Method of Smelting Ores and Cleaning Converter-Slag, of which the following is a description.

In the smelting of pyrites, pyrrhotite, or other sulfid ores the instances are few where the ores are of sufficient purity and coarseness to smelt to good advantage without the use of at least a small percentage of carbonaceous fuel.

The average sulfid ore as mined commercially contains silica so intimately incorporated with it that when the metallic sulfids melt by a process of liquation out of the siliceous shell the furnace charge is apt to form scaffolds on the walls of the furnace, and thus produce some of the serious results that have caused the failure of all of the attempts that have been made heretofore to smelt such pyritic ores without small additions at least of extraneous fuel.

The slags that are produced by the converting of copper mattes are necessarily basic and are specially adapted to dissolve the accretions mentioned above. These slags also carry sufficient copper to make it important to retreat them for the recovery of their values, and it has been the custom at many works to pour them into the forehearth of a smelting-furnace or into a reverberatory furnace for this purpose.

We have discovered that by pouring the corrosive converter-slag when molten into a blast-furnace smelting pyritic ores, and distributing it around the walls of the furnace, we can dissolve all troublesome accretions that may form on the walls and at the same time furnish additional heat that is needed to keep the furnace running continuously without coke and with the heat produced by the oxidation of the metallic sulfids of the charge.

Our invention is especially adapted to use the converter-slags produced in the method for which we have already made application for Letters Patent, Serial No. 198,593, filed March 17, 1904, wherein we smelt a low-grade matte from sulfid ores relatively low in silica and high in matte-making values, separate the slag therefrom, place the matte in a converter, blow air thereinto, add siliceous ore, and replenish the bath from time to time with fresh additions of such matte. We take the slag which is poured from the converter from time to time during the progress of that method and pour it into the smelting-furnace in which the sulfid ores are being smelted to supply the matte rich in fuel values, which constitutes one of the components of the converter charge. It cleans the slag, adds heat to the smelting-furnace, and prevents the formation of solid accretions on the walls.

Within the score of our invention the process may be modified, since

What we claim is—

1. The method herein described which consists in contributing heat to the charge of a copper-ore-smelting furnace, and recovering values contained in the slag of a copper-converter by pouring molten converter-slag upon the charge in such furnace; substantially as described.

2. The method herein described which consists in smelting sulfid ore pyritically and pouring the molten slag of a Bessemer converter upon the ore while being smelted; substantially as described.

3. The method herein described which consists in smelting sulfid ore, charging the smelted product directly into a converter, charging also silicious ore into the converter, withdrawing the slag from time to time and pouring the same in molten condition upon the ore while being smelted; substantially as described.

4. The method herein described which consists in contributing heat to the charge of a copper-ore-smelting furnace, and recovering values contained in the slag of a copper-converter, by distributing molten converter-slag upon the charge in the furnace; substantially as described.

In testimony whereof we have hereunto set our hands March 14, 1904.

RALPH BAGGALEY.
CHARLES M. ALLEN.

Witnesses:
THOMAS W. BAKEWELL,
MALCOLM L. MACDONALD.